| (12) | United States Patent | (10) Patent No.: | US 8,016,719 B2 |
|---|---|---|---|
| | Hecht et al. | (45) Date of Patent: | Sep. 13, 2011 |

(54) METHOD FOR SELECTING A NEUTRAL POSITION OF A MOTOR VEHICLE TRANSMISSION AND FOR SELECTING A PARKING DEVICE OF THE MOTOR VEHICLE

(75) Inventors: Walter Hecht, Ravensburg (DE); Armin Gierling, Langenargen (DE); Klaus Steinhauser, Kressbronn (DE); Frank Worms, Langenargen (DE); Bernd Zänglein, Ravensburg (DE); Stéphane Klein, Kressbronn (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 503 days.

(21) Appl. No.: 12/257,842

(22) Filed: Oct. 24, 2008

(65) Prior Publication Data

US 2009/0111649 A1 Apr. 30, 2009

(30) Foreign Application Priority Data

Oct. 24, 2007 (DE) .......................... 10 2007 000 558

(51) Int. Cl.
*B60W 10/18* (2006.01)
(52) U.S. Cl. ........................................... 477/94; 477/97
(58) Field of Classification Search ................. 477/92, 477/94, 97
See application file for complete search history.

(56) References Cited

U.S. PATENT DOCUMENTS

| 3,014,549 | A | * | 12/1961 | Freeman | ........................ 180/286 |
|---|---|---|---|---|---|
| 3,439,782 | A | * | 4/1969 | Irie et al. | ........................ 477/186 |
| 3,937,105 | A | | 2/1976 | Arai et al. | |
| 4,892,014 | A | | 1/1990 | Morell et al. | |
| 5,919,112 | A | | 7/1999 | Michael et al. | |
| 7,156,218 | B2 | * | 1/2007 | Yamamoto | ................ 192/219.4 |
| 7,303,057 | B2 | * | 12/2007 | Yamamoto | ................ 192/219.4 |
| 2009/0111647 | A1 | * | 4/2009 | Hecht et al. | ..................... 477/92 |
| 2009/0111648 | A1 | * | 4/2009 | Hecht et al. | ..................... 477/92 |
| 2009/0111654 | A1 | * | 4/2009 | Hecht et al. | ................... 477/195 |

FOREIGN PATENT DOCUMENTS

| DE | 41 27 991 A1 | 2/1993 |
|---|---|---|
| EP | 0 814 287 A2 | 12/1997 |

* cited by examiner

*Primary Examiner* — Ha D. Ho
(74) *Attorney, Agent, or Firm* — Davis & Bujold, P.L.L.C.

(57) ABSTRACT

A method for selecting a neutral position of a transmission and for selecting a parking device intended for immobilizing a vehicle, wherein the neutral position and the parking device can be engaged or actuated as a function of a position chosen by the driver on a selector device and as a function of other vehicle operating parameters. It is proposed that only if the vehicle has come approximately to a stop and simultaneously an ignition circuit acting on a driving motor of the vehicle is electrically interrupted and simultaneously a "Neutral" position is specified by way of the selector device, an N-holding phase, in which the transmission is in a neutral position having no frictional connection, can be activated by way of a separate control device provided in addition to the selector device, as long as an energy management system of the motor vehicle allows the activation of the N-holding phase.

24 Claims, 4 Drawing Sheets

METHOD FOR SELECTING A NEUTRAL POSITION OF A MOTOR VEHICLE TRANSMISSION AND FOR SELECTING A PARKING DEVICE OF THE MOTOR VEHICLE

This application claims priority from German Application Serial No. 10 2007 000 558.1 filed Oct. 24, 2007.

FIELD OF THE INVENTION

The invention relates to a method for selecting a neutral position of an automatic or automated motor vehicle transmission and for selecting a parking device of the motor vehicle intended for immobilizing the motor vehicle, wherein the neutral position and the parking device can be engaged or actuated as a function of a position chosen by the driver of the motor vehicle on a selector device and as a function of other operating parameters of the motor vehicle. The invention further relates to a motor vehicle controlled by the method.

BACKGROUND OF THE INVENTION

Known automatic or automated motor vehicle transmissions generally comprise a parking lock, with which an output shaft of the transmission can be mechanically fixed. In addition to a purely mechanical system for actuating such a parking lock by way of a mechanical operative interaction between a selector lever that can be operated by the driver, the lever being provided on the inside of the motor vehicle, and the parking mechanism in the transmission, electromechanical and electrohydraulic systems are also known for actuating such a parking mechanism, for example from DE 4127991 C2, wherein the parking lock in the transmission is connected via an electric operative connection to a selector device inside of the motor vehicle that can be operated by the driver, and wherein the parking lock can be electromechanically or electrohydraulically actuated by way of a parking lock function implemented in an electronic controller of the transmission, as a function of a position chosen on the selector device and as a function of other operating parameters of the motor vehicle.

Furthermore, various methods for automatically engaging such a parking mechanism are known. For example, U.S. Pat. No. 3,937,105 proposes automatically engaging the parking lock of the transmission, independently of the position selected by the driver, if an ignition circuit of the motor vehicle is interrupted and at the same time the motor vehicle still coasts at a speed below a defined low threshold value.

From U.S. Pat. No. 4,892,014, a method is known, according to which the parking lock of the transmission is automatically engaged by the electric motor if an ignition circuit of the motor vehicle is interrupted and at the same time the vehicle speed is lower than a defined low threshold value, but also if the driver door of the motor vehicle is open and at the same time no weight is applied to the driver's seat of the motor vehicle and the vehicle speed is below the small threshold value mentioned above. In both cases it is provided that during the automatic engagement of the parking lock, additionally a parking brake of the motor vehicle is automatically actuated. U.S. Pat. No. 4,892,014 also proposes to have the transmission automatically switched to the neutral position by the electric motor if the ignition circuit is closed without the driving motor of the motor vehicle running, without a drive request being necessary.

Finally, from EP 0 814 287 B1 a function for the automatic engagement of a parking lock of an automatic transmission is known, wherein the parking lock in the automatic transmission is automatically engaged by the transmission control logic if the driving speed of the motor vehicle is zero and simultaneously an ignition circuit was interrupted, and as an additional condition, either a predetermined time period after the interruption of the ignition circuit has passed, or a vehicle door is opened, but no later than when—this then being the only condition—the ignition key is removed from the ignition lock. In order to achieve better vehicle availability, in all three cases according to a special characteristic the engagement of the parking lock is prevented if the driver selected the neutral position using the selector lever directly before shutting off the engine or within a predetermined time period after shutting off the engine.

It is the object of the present invention to create a method for automatically selecting a neutral position in an automatic or automated transmission of a motor vehicle and for automatically selecting a parking device of the motor vehicle intended for immobilizing the motor vehicle, the method being an alternative to the state of the art, having sufficient safeguarding of the motor vehicle against any start-up or movement that is not intended by the driver, and also having the least possible impairment of the drivability or maneuverability of the vehicle, while avoiding changes in the operating state of the transmission and/or the vehicle which come as a surprise to the driver.

SUMMARY OF THE INVENTION

The method according to the invention proposes an Auto_P function having a complex function logic, which is based on a method wherein a neutral position of an automatic or automated transmission of a motor vehicle and a parking device of the motor vehicle intended for immobilizing the motor vehicle can be automatically engaged or actuated as a function of a position chosen by the driver of the motor vehicle on a selector device and as a function of other operating parameters of the motor vehicle. The parking device of the motor vehicle mentioned above can be both a parking mechanism in the transmission, or a parking brake in the vehicle.

A key element of the invention is the functional linkage of the individual aspects or individual criteria. To provide a clear illustration of these functional linkages that prevents misinterpretations, below the known Boolean operators are used and highlighted by upper-case letters for better legibility.

According to the invention, the method according to claim 1 comprises the following steps:

IF the motor vehicle has come at least approximately to a stop AND simultaneously an ignition circuit acting on a driving motor of the motor vehicle is electrically interrupted AND simultaneously a "Park" (P) position is chosen on the selector device, THEN the parking mechanism is and remains actuated for immobilizing the motor vehicle;

IF the motor vehicle has come at least approximately to a stop AND simultaneously the ignition circuit of the driving motor is electrically interrupted AND simultaneously a "Forward" (D) or "Reverse" (R) position is selected, THEN the parking device is automatically actuated for immobilizing the motor vehicle;

IF the motor vehicle has come at least approximately to a stop AND simultaneously the ignition circuit of the driving motor is electrically interrupted AND simultaneously a "Neutral" (N) position is chosen on the selector device AND simultaneously an N-holding phase that can be activated by way of a separate control device provided in addition to the selector device is activated, as long as an energy management system of the motor vehicle allows the N-holding phase to be activated, THEN the transmission is automatically switched into a neutral position having no frictional connection and temporarily held in the neutral position having no frictional connection;

IF the motor vehicle has come at least approximately to a stop AND simultaneously the ignition circuit of the driving motor is electrically interrupted AND simultaneously a "Neutral" (N) position is selected on the selector device AND simultaneously the N-holding phase is not activated, THEN the parking device is automatically actuated for immobilizing the motor vehicle.

It is therefore proposed that a so-called N-holding phase, in which the transmission is in the neutral position having no frictional connection, can be activated by way of a separate control device provided in addition to the selector device. To this end, this N-holding phase however can generally not be activated if a position other than "Neutral" (N) has been specified by way of the selector device. In addition, the N-holding phase can generally only be activated if additionally the motor vehicle has come at least approximately to a stop, simultaneously an ignition circuit acting on the driving motor of the motor vehicle is electrically interrupted, and simultaneously a sufficient energy supply for temporarily maintaining the transmission in the neutral position having no friction connection is available.

The method according to the invention can advantageously be used, for example, when the driver has stopped the motor vehicle in front of a vehicle washing bay and has shut off the driving motor by interrupting the ignition circuit acting on the driving motor, and the transmission of the motor vehicle inherently—for example due to absent oil pressure in the transmission as a result of the oil pump not operating—would automatically engage the parking mechanism without additional measures.

With the method according to the invention, it is possible for the driver, using simple control means, to consciously and quickly bring the motor vehicle into an operating state in which the motor vehicle can move even if the driving motor is standing still, provided that previously the "Neutral" (N) position was specified. However, if by way of the selector device a different position than "Neutral" (N) has been specified, for safety reasons the motor vehicle is generally moved to a state having an immobilized output side.

As a result, by linking the above four individual functions of the method according to the invention using logical AND, high vehicle availability is achieved, while at the same time providing maximum safety for the vehicle occupants and the surrounding area from unintentional movement of the motor vehicle.

The first of these four individual functions of the method according to the invention ("IF the motor vehicle has come at least approximately to a stop AND simultaneously an ignition circuit acting on a driving motor of the motor vehicle is electrically interrupted AND simultaneously a "Park" (P) position is chosen on the selector device, THEN the parking mechanism of the transmission is and remains actuated") takes those operating states into consideration in which the driver, before or during detection that the motor vehicle is stopped, or at least has almost come to a stop, while the ignition circuit is interrupted, has himself chosen the park position on the selector device of the motor vehicle. In addition, the first of the four individual functions of the method according to the invention also takes those operating states into consideration in which the driver during the previously activated N-holding phase chooses the park position on the selector device of the motor vehicle and thereby intentionally ends the previously activated N-holding phase. This clear driver input, according to which the motor vehicle is supposed to be immobilized by actuating the parking device, is implemented in the transmission as part of the first individual function mentioned above.

The second of the four individual functions of the method according to the invention ("IF the motor vehicle has come at least approximately to a stop AND simultaneously the ignition circuit of the driving motor is electrically interrupted AND simultaneously a "Forward" (D) or "Reverse" (R) position is selected, THEN the parking device is automatically actuated for immobilizing the motor vehicle") takes the operating states into consideration in which the selector device, before or after detection that the motor vehicle is stopped, or has almost come to a stop, while the ignition circuit is interrupted, assumes a position that would result in frictional connection in the transmission if the driving motor were running or sufficient pressure medium were supplied to the transmission. In this case, for safety reasons, the motor vehicle is automatically immobilized by actuation of the parking device in order to prevent accidental movement of the motor vehicle in any case.

The third of the four individual functions of the method according to the invention ("IF the motor vehicle has come at least approximately to a stop AND simultaneously the ignition circuit of the driving motor is electrically interrupted AND simultaneously a "Neutral" (N) position is chosen on the selector device AND simultaneously an N-holding phase that can be activated by way of a separate control device provided in addition to the selector device is activated, as long as an energy management system of the motor vehicle or the transmission allows the N-holding phase to be activated, THEN the transmission is automatically switched into a neutral position having no frictional connection and temporarily held in the neutral position having no frictional connection") defines the possibility of being able to consciously move the transmission into a state having no frictional connection under very specific circumstances. On the one hand, those initial conditions are listed which must absolutely be met to activate the so-called N-holding phase. On the other, the state of the transmission when the N-holding phase is activated is clearly described. As part of the third individual function described above, it is also already defined that by the method according to the invention, the transmission cannot be moved into a state with no friction connection without limitations, as is addressed below in detail.

As an important function for protecting the electric onboard power system of the motor vehicle and for safeguarding the starting ability of the driving motor, it is therefore proposed as part of this third individual function of the method according to the invention that the N-holding phase can always only be activated if the energy management system of the motor vehicle or of the transmissions detects that the battery of the motor vehicle, or another accumulator of electric energy installed in the motor vehicle, can provide a sufficiently high amount of energy in order to maintain the transmission in the neutral position having no frictional connection for at least a predetermined time period. In this regard, reference is made to conventional transmission designs comprising electrohydraulically actuatable parking mechanism systems, wherein the parking lock is disengaged by way of hydraulic pressure, is maintained in the disengaged state by way of an electromagnet to which electricity is applied, and engaged by way of spring force if hydraulic pressure is absent and the electromagnet has no electricity applied thereto. Particularly in connection with such a transmission, this proposed functional expansion can ensure that the N-holding phase cannot be activated at all if the electric onboard power system is able to provide only insufficient electric energy or none at all a short time after the N-holding phase is activated. This avoids an abrupt emergency abort of the previously activated N-holding phase, which would come as a surprise to the driver and-particularly in applications in which such an emergency abort of the previously activated N-holding phase is not functionally implemented-the starting ability of the driving motor of the motor vehicle is assured.

One technically simple practical embodiment of such a function for protecting the electric onboard power system of the motor vehicle and for safeguarding the starting ability of the driving motor can be, for example, to prohibit the activation of the N-holding phase if the current voltage and/or the current electric charge state of the energy storage of the motor vehicle, the electric energy of which is intended for starting the driving motor and/or for supplying the transmission controller, drops below a predetermined lower threshold value. The term "predetermined lower threshold value" here shall be interpreted as an absolute numerical value, for example a voltage of 12.5 volts.

In a technically more complex, yet functionally more precise embodiment of such a function for protecting the electric onboard power system of the motor vehicle and for safeguarding the starting ability of the driving motor, it is proposed that the current charge state of the energy storage, or the charge state of the energy storage at the beginning of the N-holding phase, or the current voltage of the energy storage, or the voltage of the energy storage at the beginning of the N-holding phase, be mathematically correlated with the amount of electric energy that is required in order to maintain the transmission in a neutral position having no frictional connection for a predetermined time period. Accordingly, in one embodiment of such a function, it may be provided that the activation of the N-holding phase is prohibited if the calculated difference between the current electric charge state of the energy storage, the electric energy of which is intended for starting the driving motor and/or for supplying the transmission controller, and the amount of electric energy that is required in order to maintain the transmission in the neutral position having no frictional connection for a predetermined time period drops below a predetermined lower threshold value. An advantageous value for such a time period is, for example, a time of 20 or 30 minutes. Such an amount of energy, for example, can be determined relatively easily by computation in that the theoretical power consumption of the transmission controller determined by the components used is integrated over the predetermined time period, or in that the mathematical product of the current operating voltage and the theoretical power consumption of the transmission controller is integrated over the predetermined time period. In a refinement of the function, the predetermined lower threshold value mentioned above can also be predetermined as a function of a temperature of the driving motor, or a temperature of the surrounding vehicle area, whereby the battery discharge behavior and the increased engine starting energy requirement at low temperatures merit special consideration.

In addition to the initial conditions mentioned above, the fulfillment of which is compulsory in order to activate the N-holding phase, in which the transmission is in a neutral position having no frictional connection, it is also possible to specify other initial conditions, which likewise must be fulfilled in order to activate the N-holding phase. For example, it may be provided that in addition to the four initial conditions already mentioned above—"motor vehicle has come at least approximately to a stop", "ignition circuit acting on the driving motor is electrically interrupted", "Neutral (N) position is specified" and "energy management system of the motor vehicle allows the activation of the N-holding phase", which must be fulfilled simultaneously in order to be able to activate the N-holding phase at all by way of the separate control device, at the same time another condition "motor vehicle is at least approximately in a horizontal position" must be fulfilled in order to be able to activate the N-holding phase.

For example, it may also be provided that in addition to the four initial conditions—"motor vehicle has come at least approximately to a stop," "ignition circuit acting on the driving motor is electrically interrupted," "Neutral (N) position is specified," and "energy management system of the motor vehicle allows the activation of the N-holding phase," which must be fulfilled simultaneously in order to be able to activate the N-holding phase at all, in which the transmission has assumed the neutral position having no frictional connection, by way of the separate control device, at the same time another condition "ignition key has not been removed from a mechanical or electromechanical ignition lock associated with the ignition key or is not located outside a defined zone around an electronic ignition lock of the motor vehicle associated with the ignition key" must be fulfilled in order to be able to activate the N-holding phase.

All initial criteria mentioned above can also advantageously be combined with each other. For example, it may be provided that the N-holding phase can only be activated IF the motor vehicle is at least approximately in a horizontal position AND simultaneously a determined current speed of the motor vehicle is less than a predetermined small threshold value (typically less than 5 km/h (3.1 mi/h)) AND simultaneously an ignition key has not been removed from a mechanical or electromechanical ignition lock associated with the ignition key or is not located outside a defined zone around an electronic ignition lock of the motor vehicle associated with the ignition key AND simultaneously a "Neutral" (N) position has been specified by way of the selector device AND simultaneously the energy management system has checked the availability of a sufficient energy supply for temporarily maintaining the N-holding phase, with positive results. In this case, five individual functions, each having dedicated function logic using Boolean AND operators, are linked to form a complex initial criterion.

In addition, it may also be provided that the N-holding phase can only be activated if it has been detected that the driver does not intend to leave, or is not leaving, the motor vehicle. The intention or action of the driver to leave, or being in the process of leaving the motor vehicle can be determined, for example, if at least one or more of the following exemplary criteria is met:
"a driver door of the motor vehicle is open"
"a driver's seat belt buckle is open"
"a driver's seat occupation sensor reports an unoccupied driver's seat"
wherein it is advantageous to functionally link at least two of these criteria to each other by way of "logical AND".

If the parking device provided for immobilizing the motor vehicle is configured as a parking mechanism having a conventional design in the transmission, and-when engaged-cannot be disengaged without sufficient oil supply to the transmission when the driving motor is stopped, then as an additional initial condition for permitting the activation of the N-holding phase, it may be provided that the N-holding phase can only be activated by way of the separate control device as long as the parking mechanism in the transmission is not yet engaged.

As a result, due to the logical linkage of these initial conditions or partial functions, as part of the third individual function of the method according to the invention, a high degree of protection against inadmissible activation of the N-holding phase is achieved by way of "logical AND".

Returning to the last of the four individual functions of the method according to the invention, the fourth individual function of the method according to the present invention ("IF the motor vehicle has come at least approximately to a stop AND simultaneously the ignition circuit of the driving motor is electrically interrupted AND simultaneously a "Neutral" (N) position is chosen on the selector device AND simultaneously the N-holding phase is not activated, THEN the parking device is automatically actuated for immobilizing the motor vehicle") takes those operating states into consideration in which the selector device, prior to or during detection that the motor vehicle is stopped or at least has almost come to a stop while the ignition circuit is interrupted, is in the "Neutral" (N) position, but the N-holding phase is not activated. In this case, for safety reasons, the parking device is automatically actuated such that accidental movement of the motor vehicle is in any case prevented.

Below, the possible functions of the method according to the invention as part of the activated N-holding phase will be addressed in more detail, divided into the categories "important functions when the N-holding phase is activated" and "optional functions when the N-holding phase is activated." If needed, the person skilled in the art will combine the proposed functions advantageously with each other.

An important function is one in which, if the N-holding phase was or is activated, simultaneously an acoustic and/or optical display is triggered and/or issued. This warns the driver that he performed a manual intervention or that an intervention affecting the immobilization of the motor vehicle was performed and the motor vehicle can thus move.

As an optional function for increasing protection against accidental removal of the ignition key, it may be provided that when the holding phase was or is activated, simultaneously an ignition lock blocking mechanism-also referred to as a "key lock"—is activated, which prevents the mechanical ignition key from being removed from the mechanical or electromechanical ignition lock, or electronic ignition key—for example in the form of a "ID card"—from being removed too far from the electronic ignition lock.

With respect to a de-activation of the previously specifically activated N-holding phase, in which the transmission is in a neutral position having no frictional connection, two variants are proposed. In the first of these two variants, it is proposed that the previously activated H-holding phase can be de-activated manually by the driver—preferably by way of the separate control device—which is a function of the category of "important functions." In this case, it is advantageous that the motor vehicle is automatically immobilized by actuation of the parking device if the previously activated N-holding phase is terminated manually, regardless of the "Neutral" (N) position previously chosen by way of the selector device. For manually de-activating the previously activated N-holding phase, the driver also has the selector device at his disposal and can change the specified position from "Neutral" (N) to "Park" (P).

In the second variant, it is proposed that the previously activated N-holding phase, in which the transmission is in the neutral position having no frictional connection, can be automatically de-activated. When such an automatic abort of the previously activated N-holding phase should or must occur, is based particularly on aspects of operational safety and the failure safety of the system.

As an important function for protecting the electric onboard power system of the motor vehicle and for safeguarding the starting ability of the driving motor, it is proposed that the previously activated N-holding phase can automatically be de-activated by an energy management system of the motor vehicle or the transmission. The problems associated with conventional transmission designs having electrohydraulically actuatable parking mechanisms systems, in which the parking mechanism is maintained in the disengaged state by way of an electromagnet to which electricity is applied, were already addressed as part of the initial conditions to be fulfilled for activating the N-holding phase. Particularly in connection with such a transmission, this proposed functional expansion can prevent the vehicle battery from being discharged excessively by the amount of electric energy consumed as part of the method according to the invention.

Efficient protection of the vehicle battery from excessive discharge is provided by the monitoring of the current electric charge state or the current voltage of the vehicle battery. Accordingly, it is proposed in one variant that the previously activated N-holding phase be automatically terminated if the current charge state and/or the current voltage of an electric energy storage of the motor vehicle, which is provided for starting the driving motor and/or supplying the transmission controller, drops to a value below a predetermined discharge threshold. The term "predetermined discharge threshold" shall be interpreted as an absolute numerical value, for example a voltage of 12 volts.

In a technically more complex, yet functionally more precise embodiment of such a function for protecting the electric onboard power system of the motor vehicle and for safeguarding the starting ability of the driving motor, it is proposed that the amount of energy actually drawn, as a part of the inventive function, from the vehicle battery, or from the electric energy storage of the motor vehicle provided for supplying the transmission controller and/or for starting the driving motor—particularly the transmission controller—be monitored, and mathematically correlated with the current charge state of the energy storage, or the charge state of the energy storage at the beginning of the N-holding phase, or the current voltage of the energy storage, or the voltage of the energy storage at the beginning of the N-holding phase. Accordingly, in one embodiment of such a function, it may be provided that the previously activated N-holding phase be automatically terminated if the calculated difference between the current electric charge state of the energy storage, the electric energy of which is intended for starting the driving motor and/or for supplying the transmission controller, and the amount of electric energy that was drawn as part of the inventive function from the electric energy storage of the motor vehicle for maintaining the transmission in the neutral position, exceeds a predetermined upper threshold value, wherein this upper threshold value is predefined as a function of the current voltage of the energy storage, or as a function of the voltage of the energy storage at the beginning of the N-holding phase, or as a function of the current electric charge state of the energy storage, or as a function of the electric charge state of the energy storage at the beginning of the N-holding phase. Such an amount of energy can be determined relatively easily, for example by computation, in that the actual current power consumption of the transmission controller is integrated over time since the beginning of the N-holding phase, or in that the mathematical product of the actual current operating voltage and the actual current power consumption of the transmission controller is integrated over time since the beginning of the N-holding phase. In a refinement of the function, the predetermined upper threshold value mentioned above can also be predetermined as a function of a temperature of the driving motor, or a temperature of the surrounding vehicle area, whereby the battery discharge behavior and the increased engine starting energy requirement at low temperatures merit special consideration.

As an optional function for increasing protection against driver carelessness, it may also be provided that the previously activated N-holding phase be automatically terminated if a predetermined time interval has expired. Such automatic termination of the N-holding phase in the manner of a reproducible event is easy to comprehend for the driver and therefore less surprising than other automatic aborts of the N-holding phase. This function additionally has the advantage that the electric onboard power system of the motor vehicle is not subjected to excessive strain by the method according to the invention, provided that the charge state of the vehicle battery at the beginning of the N-holding phase has not already reached a low level. The time interval mentioned above is advantageously started when the command for activation of the N-holding phase is detected, or at the latest when the transmission is in fact in the neutral position.

As an optional function for increasing safety if the operating parameters vary, it is proposed that the previously activated N-holding phase be automatically terminated if the current speed of the motor vehicle is greater than a predetermined speed threshold. In this way it is ensured that the motor vehicle can move only within predetermined limits. To this end, this predetermined speed threshold may also be greater than the predetermined small threshold value of the vehicle speed which must not be exceeded on activation of the N-holding phase.

As an optional function for increasing safety if the operating parameters vary, it may also be provided that the previously activated N-holding phase be automatically terminated if the motor vehicle is not at least in an approximately horizontal position.

As an optional function for increasing the previously activated N-holding phase be the protection against driver carelessness and misuse, it is proposed that automatically terminated if the ignition key has been removed from the mechanical or electromechanical ignition lock or is located outside a predetermined zone around the electronic ignition lock.

In connection with all the functions mentioned above for the automatic de-activation of the previously activated N-holding phase, it is proposed for safety reasons to automatically immobilize the motor vehicle by actuating the parking device whenever the previously activated holding phase is automatically terminated, regardless of the "Neutral" position previously chosen by way of the selector device. This reliably prevents the transmission from later being inadvertently moved to a position that would result in immediate frictional connection in the transmission when starting the engine.

The monitoring of whether the driver remains in the motor vehicle is another function of the category of "important functions when the N-holding phase is activated". Such monitoring provides increased protection against driver carelessness. With respect to the reaction to detection that the driver intends to leave or is in the process of leaving the motor vehicle, while the ignition circuit of the driving motor of the at least nearly stopped motor vehicle is electrically interrupted, the N-holding phase is active, and the transmission accordingly is in the neutral position having no frictional connection, two different variants are proposed. In the safety-oriented first variant, it is proposed that that the N-holding phase immediately be terminated and the parking device automatically actuated in order to immobilize the motor vehicle if it is detected that the driver intends to leave or is in the process of leaving the motor vehicle. In the mobility-oriented second variant, it is proposed that the N-holding phase be left in the active state and that a suitable warning simultaneously be triggered or actuated if it is detected that the driver intends to leave or is in the process of leaving the motor vehicle. This warning—for example an acoustic or optical warning—is intended to inform the driver that the N-holding phase is still active and the transmission remains without frictional connection, thus allowing the motor vehicle to move. If the driver ignores this warning and leaves the motor vehicle without previously moving the selector device to "Park" (P) and/or without having switched off the N-holding phase earlier by way of the separate control device, it can be assumed that he consciously intends to keep the motor vehicle in a movable state without having to be personally present in the vehicle interior. The other criteria for automatic abort of the N-holding phase are of course not affected by this partial function and can therefore still result in automatic actuation of the parking device, as described above. As mentioned above, the intention or action of the driver to leave the motor vehicle can be concluded if one or more of the following exemplary criteria are met:

"a driver door of the motor vehicle is open"

"a driver's seat belt buckle is open"

"a driver's seat occupation sensor reports an unoccupied driver's seat".

For the rest, if necessary, the person skilled in the art will advantageously combine the proposed embodiments for automatic de-activation of the N-holding phase with each other and, if necessary, also with the embodiments for manual de-activation of the N-holding phase.

BRIEF DESCRIPTION OF THE DRAWINGS

The invention will now be described, by way of example, with reference to the accompanying drawings in which.

DETAILED DESCRIPTION OF THE INVENTION

Figure 1A:
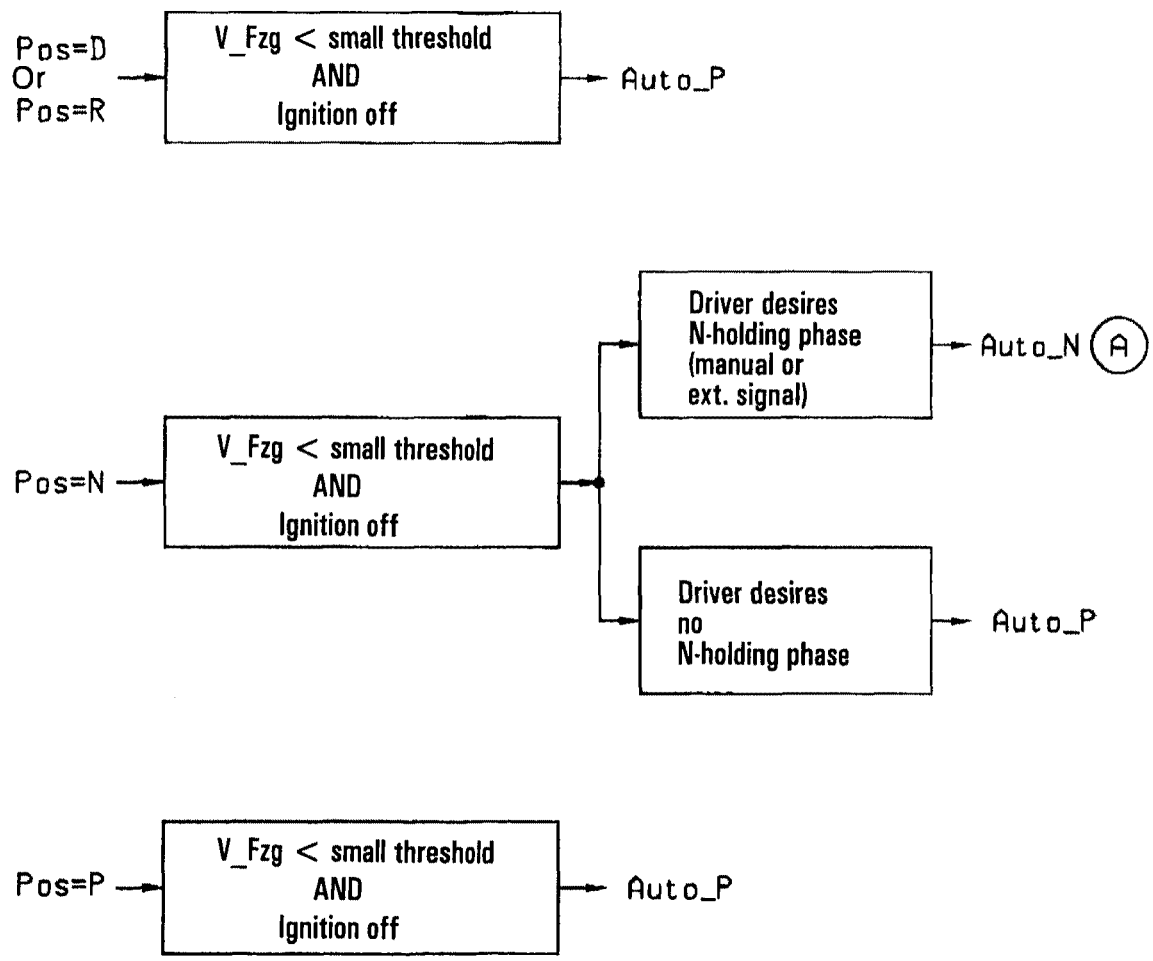
FIGS. 1A and 1B are exemplary technical implementation of a method according to the inventive solution.

The functional blocks that are absolutely essential as part of the respective technical implementation are shown with solid lines, while functional blocks that may optionally be provided as part of the respective technical implementation are shown with dotted lines. Since in light of the detailed description of the method, the two graphical illustrations are clearly comprehensible by the person skilled in the art, a comprehensive explanation of the Figures can be foregone here in order to avoid repetitions. The reference numerals used and their significance are listed in the list of reference numerals.

Figure 1B:
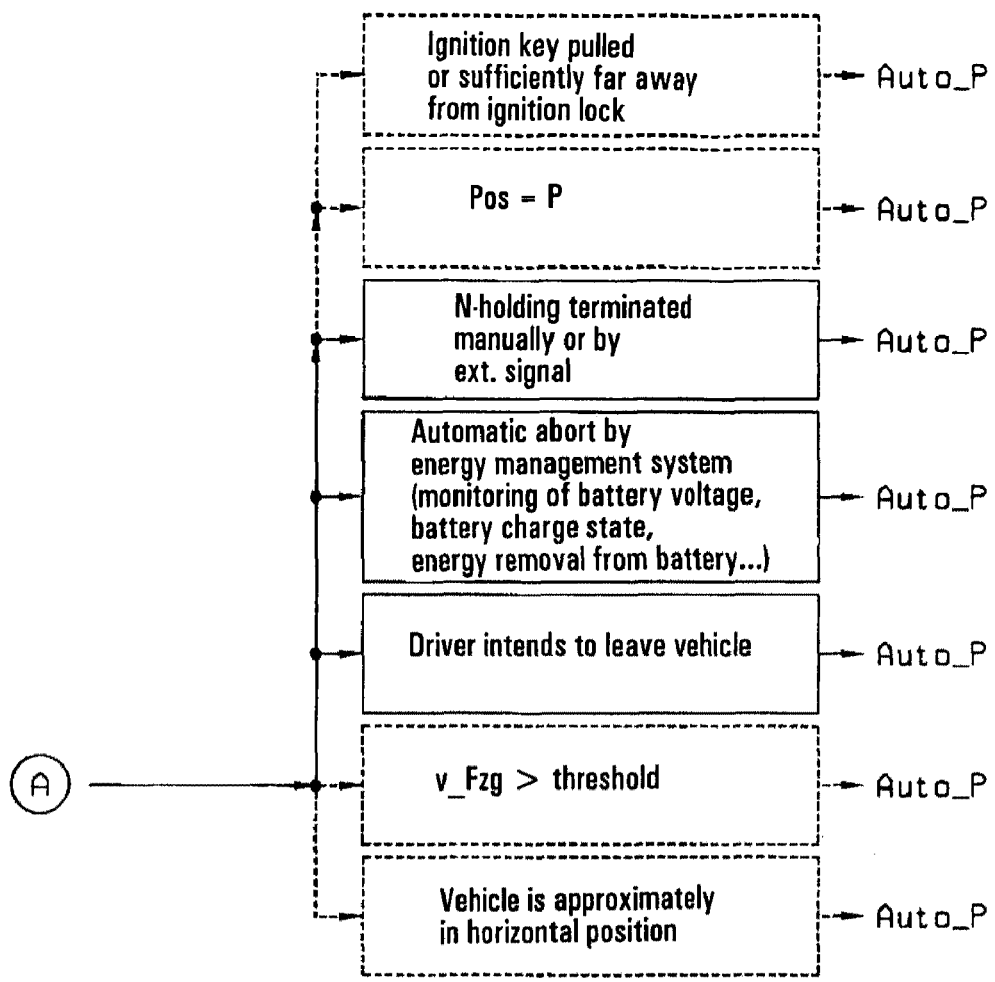
Figure 2A:
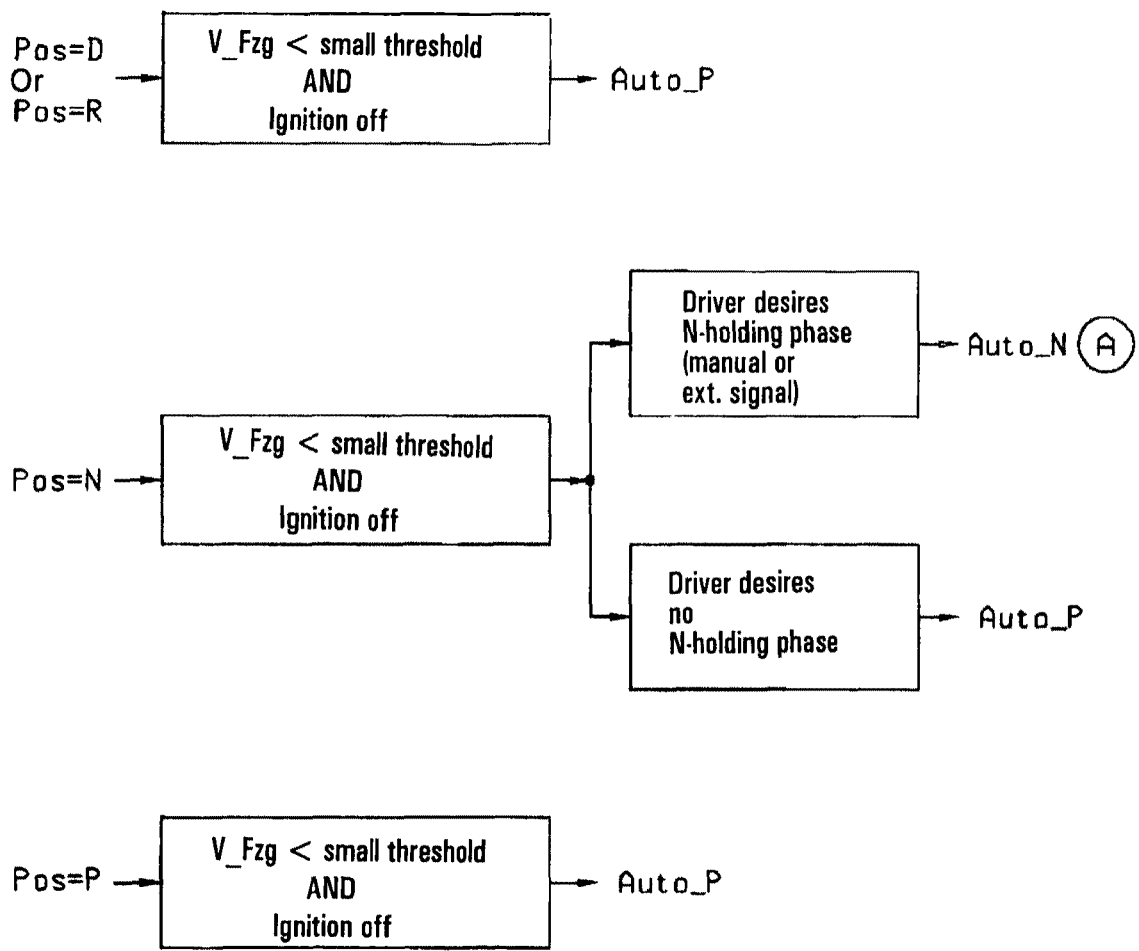
FIGS. 2A and 2B are further implementations of a method according to the inventive solution.
Figure 2B:
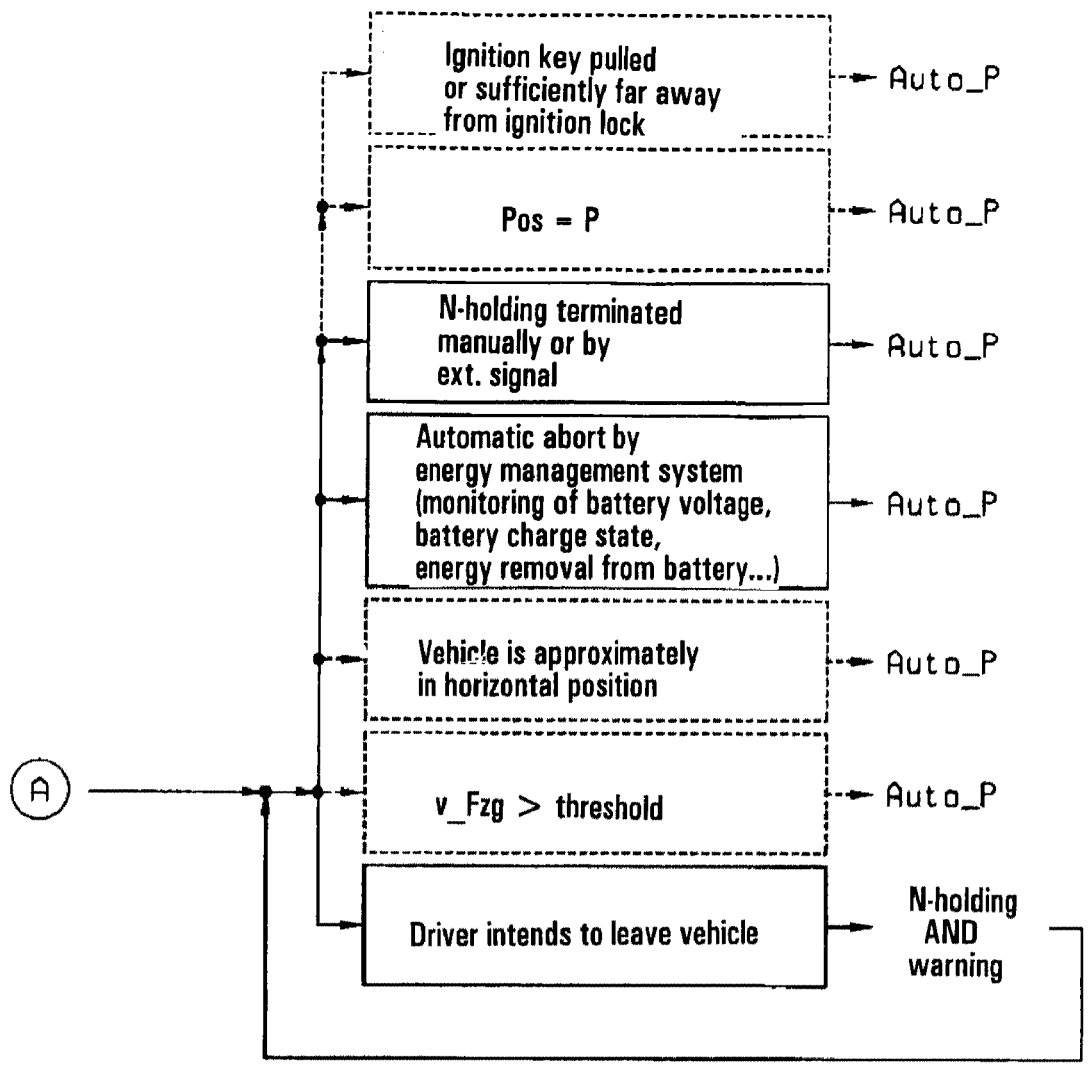

The essential difference between the two graphically illustrated flow charts is easily apparent: In the first case (FIG. 1), the parking mechanism of the transmission is engaged automatically ("Auto_P") if the desire of the driver to leave the motor vehicle is detected while the N-holding phase ("Auto_N") is activated. In contrast, in the second case (FIG. 2) the transmission remains in the neutral position ("N_Hold") if the desire of the driver to leave the motor vehicle while the N-holding phase is activated is detected, wherein the driver is informed via a suitable warning that the transmission has no frictional connection and the vehicle could move. In the second case (FIG. 2), the driver is thus provided with greater freedom to act because it is assumed that the driver performs his actions—moving the transmission to the neutral position and exiting the vehicle—quite consciously and intentionally.

Below, refinements of the method according to the invention will be addressed, which relate to a further increase in convenience for the driver of the motor vehicle. It may be provided that by way of the separate control device that is provided for activating the N-holding phase, in addition other units of the motor vehicle can be selected. It is particularly advantageous with such a refinement if, simultaneously with or close to the activation of the N-holding phase, by way of this separate control device additionally a command is issued for closing a sunroof that can be actuated by an electric motor, or a folding roof or folding top that can be actuated by an electric motor or electrohydraulically, and/or windows of the motor vehicle that can be actuated by an electric motor.

Below, additional embodiments of the method according to the invention shall be addressed in more detail, which relate to particular embodiments of the separate control device, which is provided at least for activating the N-holding phase with a neutral position having no frictional connection in the transmission.

It may be provided that the separate control device for activating and de-activating the N-holding phase is configured as a switch that can be operated by the driver. Accordingly, the N-holding phase, in which the transmission is in the neutral position having no frictional connection, can be activated and/or de-activated by the driver by manually actuating this switch. The design and spatial arrangement of such a switch in the interior of the motor vehicle can be optional and are at the discretion of the person skilled in the art. One example shall be an electromechanical switch, which is integrated in the ignition lock, for example such that the N-holding phase is activated by electrically interrupting the ignition circuit by way of the ignition lock. Another embodiment that shall be mentioned is an electromechanical switch, which is configured as part of the selector device or integrated in the selector device.

However, it may also be provided, for example, that the separate control device for activating and de-activating the N-holding phase is configured as a remote-controllable switch, which can be actuated from outside the motor vehicle. Accordingly, the N-holding phase, in which the transmission is in the neutral position having no frictional connection, can be activated and/or de-activated by actuating this remote-controllable switch from outside the vehicle. To this end, particularly systems having (stationary or mobile) transmitters located outside the motor vehicle can be considered in order to specifically influence the maneuverability of the motor vehicle from outside, for example using a transmitter at the entrance of a vehicle washing bay or a transmitter in a repair shop.

Furthermore, it may also be provided, for example, that the separate control device for activating and de-activating the N-holding phase is configured as a sensor switch, which evaluates the signals of the surrounding area of the motor vehicle. Accordingly, the N-holding phase, in which the transmission is in the neutral position having no frictional connection, can be activated and/or de-activated by this sensor. To this end, particularly image detection sensors are possible with which, for example, information signs, or the entrance to a car wash or a railroad crossing can be suitably detected as part of a pattern detection for predetermined ambient conditions, wherein the position chosen by the selector device does not necessarily have highest priority as regards which position is in fact engaged in the transmission.

If necessary, the person skilled in the art will advantageously combine the three switch variations of "switch remote-controllable by the driver", "remote-controllable switch" and "sensor" mentioned above.

In principle, the method according to the invention is suited for selecting a parking device having an arbitrary design. The parking device can be configured both as a positively locking parking lock and also as a non-positively locking parking brake. Typically, a parking device in the transmission is configured as a parking lock, but a design as a parking brake is also conceivable. A parking device in the vehicle for immobilizing the motor vehicle is usually configured as a parking brake.

Typically, the parking mechanism of an automatically shifting or automated transmission is integrated directly in the transmission. Typically, the selector system of the parking mechanism operating mechanically, hydraulically, pneumatically, electrically, hydromechanically, pneumomechanically, electromechanically, electrohydraulically or electropneumatically is integrated in the transmission, or arranged directly on the outside at the transmission, in familiar transmission designs. In the case of an electromechanically, electrohydraulically or electropneumatically operating selector system of the parking mechanism, the actuator acting on the parking mechanism is usually selected by a transmission controller. In this respect it is useful to integrate all the control functions, which are required for implementing the command to activate and de-activate the N-holding phase having a neutral position of the transmission with no frictional connection in the transmission, in the transmission controller so that the transmission controller initiates the engagement of the neutral position in the transmission when the N-holding phase is activated and the actuation of the parking device in the transmission or in the vehicle when the N-holding phase is de-activated.

In principle, however, it is also possible to provide a separate control device, which then advantageously communicates with the transmission and the transmission controller. In any case, suitable communication is required between the separate controller and the transmission or transmission controller. It may be provided that the engagement of the neutral position in the transmission during activation of the N-holding phase, and the actuation of the parking device in the transmission and/or in the vehicle during de-activation of the N-holding phase, are initiated by a controller of the separate control device of the motor vehicle.

As mentioned above, the method is suited for selecting a parking brake having an arbitrary design. If the parking brake is provided in the vehicle, it is generally an integral part of the service brake system in the vehicle and can be operated mechanically or electrohydraulically by the driver and can also be selected by a brake controller, if such a component is provided. However, self-sufficient systems, which is to say systems that are independent from the service brake of the motor vehicle, are also known. In connection with selection of a parking brake in the vehicle as part of the invention, in any case suitable communication is required between the separate control device and the other two components involved, which is to say the parking brake and transmission, or service brake and transmission controller.

A motor vehicle comprises an automatic or automated transmission, a selector device that can be operated by the driver of the motor vehicle for specifying a position (P, R, N, D) of the transmission, a parking device for immobilizing the motor vehicle, a controller for selecting the parking device for shifting positions in the transmission as a function of the position (P, R, N, D) chosen with the selector device and as a function of other operating parameters of the motor vehicle and an additional separate control device for specifying a holding phase in which the transmission is in the neutral position having no frictional connection and is controlled by the method according to the invention described above. The parking device can be configured as a parking lock in the transmission and/or as a parking brake in the vehicle.

REFERENCE NUMERALS v_Fzg vehicle speed
Pos position chosen on a selector device
p "Park" position
N "Neutral" position
R "Reverse" position
D "Forward" position
Auto_N functional step "Engaging and maintaining the neutral position in the transmission"
Auto_P functional step "Engaging the parking mechanism and maintaining the parking mechanism in the engaged state"
N_Hold functional step "Maintaining the neutral position in the transmission"
N-holding phase state "Transmission in the neutral position having no frictional connection"

The invention claimed is:

1. A method of selecting a neutral position of an automatic or automated transmission of a motor vehicle and of selecting a parking device of the motor vehicle intended for immobilizing the motor vehicle, the neutral position and the parking device being engageable or actuatable as a function of a position (P, R, N, D) chosen by the driver of the motor vehicle via a selector device and as a function of other operating parameters of the motor vehicle, the method comprising the following steps:
   IF the motor vehicle has come at least approximately to a stop AND simultaneously an ignition circuit acting on a driving motor of the motor vehicle is electrically interrupted AND simultaneously a "Park" (P) position is selected by the selector device, THEN the parking device is and remains actuated for immobilizing the motor vehicle;
   IF the motor vehicle has come at least approximately to a stop AND simultaneously the ignition circuit of the driving motor is electrically interrupted AND simultaneously a "Forward" (D) or a "Reverse" (R) position is selected by the selector device, THEN the parking device is automatically actuated for immobilizing the motor vehicle;
   IF the motor vehicle has come at least approximately to a stop AND simultaneously the ignition circuit of the driving motor is electrically interrupted AND simultaneously a "Neutral" (N) position is selected by the selector device AND simultaneously an N-holding phase that can be activated by way of a separate control device provided in addition to the selector device is activated, as long as an energy management system of the motor vehicle or the transmission allows the N-holding phase to be activated, THEN the transmission is automatically switched into a neutral position having no frictional connection and temporarily held in the neutral position having no frictional connection;
   IF the motor vehicle has come at least approximately to a stop AND simultaneously the ignition circuit of the driving motor is electrically interrupted AND simultaneously a "Neutral" (N) position is selected by the selector device AND simultaneously the N-holding phase is not activated, THEN the parking device is automatically actuated for immobilizing the motor vehicle.

2. The method according to claim 1, further comprising the step of the energy management system only allowing the N-holding phase to be activated if at least one of a current charge state, a current voltage of an energy storage of the motor vehicle, an electric energy of which is intended for supplying a controller of the transmission and for starting the driving motor, has not dropped below a predetermined lower threshold value.

3. The method according to claim 1, further comprising the step of the energy management system allowing the N-holding phase to be activated only if a calculated variance between at least one of a current electric charge state of the energy storage, an electric energy of which is intended for one of starting the driving motor and for supplying a controller of the transmission, and an amount of electric energy that is required to maintain the transmission in the neutral position having no frictional connection for a predetermined period has not dropped below a predetermined lower threshold value.

4. The method according to claim 3, further comprising the step of determing the amount of energy by way of mathematical integration of a theoretical power consumption of the controller over the predetermined period, or by way of mathematical integration of the product of the actual operating voltage and the theoretical power consumption of the controller over a predetermined period.

5. The method according to claim 2, further comprising the step of predetermining the lower threshold value as a function of a temperature of the driving motor or a temperature of an area surrounding the vehicle.

6. The method according to claim 1, further comprising the step of only activating the N-holding phase if the motor vehicle is at least approximately in a horizontal position.

7. The method according to claim 1, further comprising the step of only activating the N-holding phase if an ignition key has not been removed from a mechanical or electromechanical ignition lock associated with the ignition key, or is not located outside a defined zone around an electronic ignition lock of the motor vehicle associated with the ignition key.

8. The method according to claim 1, further comprising the step of only activating the N-holding phase if it is detected that the driver does not intend to, or is not leaving, the motor vehicle.

9. The method according to claim 1, further comprising the step of only activating the N-holding phase as long as a parking mechanism in the transmission provided for immobilizing the motor vehicle has not yet been engaged.

10. The method according to claim 1, further comprising the step of only permitting deactivation of the previously activated N-holding phase manually by the driver by way of the separate control device.

11. The method vehicle according to claim 1, further comprising the step of automatically actuating the parking device for immobilizing the motor vehicle if the previously activated N-holding phase is manually terminated.

12. The method according to claim 11, further comprising the step of automatically terminating the previously activated N-holding phase if one or more of the following conditions are detected:
   an ignition key has been removed from the mechanical or electromechanical ignition lock or is located outside a predetermined zone around the electronic ignition lock;
   a current speed of the motor vehicle is greater than a predetermined speed threshold;

the motor vehicle is not in an at least approximately horizontal position;

the driver intends to leave the motor vehicle or is leaving the motor vehicle;

a predetermined time interval has expired.

13. The method according to claim 11, further comprising the step of automatically terminating the previously activated N-holding phase by the energy management system of the motor vehicle or of the transmission.

14. The method according to claim 13, further comprising the step of automatically terminating the previously activated N-holding phase if at least one of a current charge state, a current voltage of an energy storage of the motor vehicle, the electric energy of which is intended for supplying a controller of the transmission or for starting the driving motor, has dropped to a value below a predetermined discharge threshold.

15. The method according to claim 13, further comprising the step of automatically terminating the previously activated N-holding phase if the amount of energy drawn as part of the method from the electric energy storage of the motor vehicle intended for supplying a controller of the transmission or for starting the driving motor has reached or exceeded a predetermined threshold value.

16. The method according to claim 15, further comprising the step of determining the amount of energy by way of mathematical integration of the actual power consumption of the controller over time, or by way of mathematical integration of the product of the actual operating voltage and the actual power consumption of the controller over time.

17. The method according to claim 1, further comprising the step actuating the parking device for immobilizing the motor vehicle if the previously activated N-holding phase is manually or automatically terminated.

18. The method according to claim 1, further comprising the step of selecting additionally units of the motor vehicle by way of the separate control device provided for the activation of the N-holding phase.

19. The method according to claim 18, further comprising the step of issuing, simultaneously with or close to the activation of the N-holding phase, a command for closing a sunroof that can be actuated by an electric motor, or a folding roof or folding top that can be actuated by the electric motor or electrohydraulically, or windows of the motor vehicle that can be actuated by the electric motor.

20. The method according to claim 1, further comprising the step of activating or deactivating the N-holding phase by the driver by manual actuation of a switch.

21. The method according to claim 1, further comprising the step of one of activating and deactivating the N-holding phase by actuating a remote-controllable switch from outside the motor vehicle.

22. The method according to claim 1, further comprising the step of one of activating and deactivating the N-holding phase by a sensor which evaluates signals of an exterior area surrounding the vehicle.

23. The method according to claim 1, further comprising the step of one of triggering or issuing at least one of an acoustic display and an optical display if it is detected that the driver intends to leave, or is leaving, the vehicle while the N-holding phase is activated.

24. A motor vehicle comprising an automatic or automated transmission, a selector device that can be operated by the driver of the motor vehicle for specifying a position (P, R, N, D) of the transmission, a parking device intended for immobilizing the motor vehicle, a controller for selecting the parking device and shifting positions in the transmission as a function of the position (P, R, N, D) chosen on the selector device and as a function of other operating parameters of the motor vehicle, and an additional separate control device for specifying an N-holding phase, in which the transmission is in the neutral position having no frictional connection, controlled by a method comprising the steps of:

IF the motor vehicle has come at least approximately to a stop AND simultaneously an ignition circuit acting on a driving motor of the motor vehicle is electrically interrupted AND simultaneously a "Park" (P) position is selected by the selector device, THEN the parking device is and remains actuated for immobilizing the motor vehicle;

IF the motor vehicle has come at least approximately to a stop AND simultaneously the ignition circuit of the driving motor is electrically interrupted AND simultaneously a "Forward" (D) or a "Reverse" (R) position is selected by the selector device, THEN the parking device is automatically actuated for immobilizing the motor vehicle;

IF the motor vehicle has come at least approximately to a stop AND simultaneously the ignition circuit of the driving motor is electrically interrupted AND simultaneously a "Neutral" (N) position is selected by the selector device AND simultaneously an N-holding phase that can be activated by way of a separate control device provided in addition to the selector device is activated, as long as an energy management system of the motor vehicle or the transmission allows the N-holding phase to be activated THEN the transmission is automatically switched into a neutral position having no frictional connection and temporarily held in the neutral position having no frictional connection;

IF the motor vehicle has come at least approximately to a stop AND simultaneously the ignition circuit of the driving motor is electrically interrupted AND simultaneously a "Neutral" (N) position is selected by the selector device AND simultaneously the N-holding phase is not activated, THEN the parking device is automatically actuated for immobilizing the motor vehicle.

* * * * *